United States Patent
Hynds et al.

(10) Patent No.: US 12,207,087 B2
(45) Date of Patent: *Jan. 21, 2025

(54) SECURE STORAGE DEVICE

(71) Applicant: DERRY TECHNOLOGICAL SERVICES, INC., Derry, NH (US)

(72) Inventors: Patrick Joseph Hynds, Derry, NH (US); Duane Leo Laflotte, Merrimack, NH (US)

(73) Assignee: DERRY TECHNOLOGICAL SERVICES, INC., Concord, NH (US)

( * ) Notice: Subject to any disclaimer, the term of this patent is extended or adjusted under 35 U.S.C. 154(b) by 300 days.

This patent is subject to a terminal disclaimer.

(21) Appl. No.: 17/646,363

(22) Filed: Dec. 29, 2021

(65) Prior Publication Data

US 2022/0207189 A1   Jun. 30, 2022

Related U.S. Application Data

(60) Provisional application No. 63/162,114, filed on Mar. 17, 2021, provisional application No. 63/131,986, filed on Dec. 30, 2020.

(51) Int. Cl.
| | |
|---|---|
| *G06F 21/60* | (2013.01) |
| *G06F 21/32* | (2013.01) |
| *G06F 21/45* | (2013.01) |
| *G06F 21/78* | (2013.01) |
| *H04W 12/06* | (2021.01) |
| *H04W 12/63* | (2021.01) |

(52) U.S. Cl.
CPC ......... *H04W 12/068* (2021.01); *G06F 21/32* (2013.01); *G06F 21/45* (2013.01); *G06F 21/602* (2013.01); *G06F 21/78* (2013.01); *H04W 12/63* (2021.01); *G06F 2221/2111* (2013.01)

(58) Field of Classification Search
CPC ..... H04W 12/068; H04W 12/63; G06F 21/32; G06F 21/45; G06F 21/602; G06F 21/78; G06F 2221/2111; G06F 21/6209; H04L 63/0428; H04L 63/107; H04L 2463/082; H04L 63/0861

See application file for complete search history.

(56) References Cited

U.S. PATENT DOCUMENTS

| | | | |
|---|---|---|---|
| 7,725,628 B1 | 5/2010 | Phan et al. | |
| 2003/0154382 A1* | 8/2003 | Vicard | G07C 9/257 |
| | | | 713/186 |

(Continued)

FOREIGN PATENT DOCUMENTS

| | | | |
|---|---|---|---|
| CN | 104253801 A | * | 12/2014 |
| JP | 2003196921 A | * | 7/2003 |

OTHER PUBLICATIONS

International Search Report and Written Opinion from International Application No. PCT/US2021/065494 dated Mar. 23, 2022.

*Primary Examiner* — Trong H Nguyen

(74) *Attorney, Agent, or Firm* — Lando & Anastasi, LLP

(57) ABSTRACT

Techniques for securing data in a storage device are disclosed. The storage device includes one or more authentication components including one or more of a biometric reader, a positioning system, and a wireless receiver. The storage device further includes a security subsystem configured to secure data using multiple authentication factors obtained using the one or more authentication components.

16 Claims, 15 Drawing Sheets

(56) References Cited

U.S. PATENT DOCUMENTS

| | | |
|---|---|---|
| 2006/0204047 A1 | 9/2006 | Dave et al. |
| 2007/0033320 A1 | 2/2007 | Wu et al. |
| 2011/0083017 A1 | 4/2011 | Ali et al. |
| 2014/0109184 A1 | 4/2014 | Parker, II |
| 2016/0180068 A1 | 6/2016 | Das et al. |
| 2018/0069842 A1* | 3/2018 | McCallum ............ H04L 63/061 |
| 2019/0089708 A1* | 3/2019 | Pattar ...................... G06F 21/40 |
| 2020/0313868 A1 | 10/2020 | Vendelbo |
| 2022/0309193 A1 | 9/2022 | Klapman et al. |

\* cited by examiner

Vault

Encryption Parameters

☑ Geolocation Required    [Configure]  *READY*
Sets a location and distance that defines where the device must be for the data to be accessed Upload data to be encrypted.

[Browse...]   Files Selected: 12
              Size: 100 MB

| Attendee # | ID | Fingerprint Required | Fingerprint Optional | Password or Pin | BlueTooth Device | | |
|---|---|---|---|---|---|---|---|
| 1 | Mr. Pink | ☑ | ☐ | ☐ | ☐ | [Configure] | *READY* |
| 2 | Alias2307 | ☐ | ☑ | ☐ | ☐ | [Configure] | *READY* |
| 3 | Nighthawk | ☑ | ☑ | ☑ | ☑ | [Configure] | *REQUIRED* |
| 4 | General Wilson | ☐ | ☑ | ☐ | ☐ | [Configure] | *REQUIRED* |
| 4 | Alias472 | ☐ | ☑ | ☑ | ☑ | [Configure] | *REQUIRED* |

[Encrypt and Upload File(s)]

*Need at least 1 file selected and all attendees configured to continue with encryption.*

FIG. 3B

SECURE STORAGE DEVICE

RELATED APPLICATIONS

This application claims the benefit of U.S. Provisional Patent Application Ser. No. 63/131,986, titled "SECURE STORAGE DEVICE," filed Dec. 30, 2020, and U.S. Provisional Patent Application Ser. No. 63/162,114, titled "SECURE STORAGE PASS-THROUGH DEVICE," filed Mar. 17, 2021, both of which are hereby incorporated by reference in their entireties for all purposes.

This application is related to U.S. patent application Ser. No. 17/646,374, titled "SECURE STORAGE PASS-THROUGH DEVICE," filed on Dec. 29, 2021, now U.S. Pat. No. 11,956,631, which is hereby incorporated by reference in its entirety for all purposes.

BACKGROUND

There are many situations in which data needs to be secured from unauthorized access. Various approaches to securing data exist. However, typical security approaches are not strong enough to withstand sustained, deliberate, and sophisticated circumvention efforts. For example, many encryption tools leave a key in the hands of a third party (e.g., a storage service provider or storage device manufacturer), such that data security can never be fully guaranteed. Many security approaches have a single point of failure, e.g., a single password or biometric credential needed to gain access to the encrypted data; a single point of failure is often readily susceptible to brute force hacking. Moreover, many security approaches merely protect access to the data; the data itself may not even be encrypted.

Approaches described in this section have not necessarily been conceived and/or pursued prior to the filing of this application. Accordingly, unless otherwise indicated, approaches described in this section should not be construed as prior art.

TECHNICAL FIELD

The present disclosure relates generally to securing storage devices.

SUMMARY

In general, in one aspect, a storage device includes: one or more authentication components including one or more of a biometric reader, a positioning system, and a wireless receiver; and a security subsystem configured to secure data using multiple authentication factors obtained using the one or more authentication components.

The authentication factors may include biometric credentials associated, respectively, with a plurality of users. The security subsystem may be configured to require the biometric credentials in a predetermined order. The biometric credentials may include biometric credentials of at least one required user and at least one optional user from multiple optional users. The security subsystem may be configured to store authorized biometric credentials in an index. The index may include dummy biometric credentials prepopulated at unused index locations.

The authentication factors may include a position of the storage device determined using the positioning system, the position of the storage device including one or more of a geographical location, a logical location, and an altitude. The authentication factors may include proximity of at least one authentication device determined using the wireless receiver.

The storage device may further include instructions for presenting a user interface for configuring the authentication factors. Configuring the authentication factors may include obtaining user input defining one or more required factors in the multiple authentication factors.

In general, in one aspect, a method for securing data includes: obtaining multiple authentication factors using one or more authentication components of a secure storage device, the one or more authentication components including one or more of a biometric reader, a positioning system, and a wireless receiver; and securing data using the multiple authentication factors obtained using the one or more authentication components.

The authentication factors may include biometric credentials associated, respectively, with a plurality of users. Securing the data may include requiring the biometric credentials in a predetermined order. The biometric credentials may include biometric credentials of at least one required user and at least one optional user from multiple optional users. The method may include storing authorized biometric credentials in an index. The index may include dummy biometric credentials prepopulated at unused index locations.

The authentication factors may include a position of the storage device determined using the positioning system, the position of the storage device including one or more of a geographical location, a logical location, and an altitude. The authentication factors may include proximity of at least one authentication device determined using the wireless receiver.

The method may further include presenting a user interface for configuring the authentication factors. Configuring the authentication factors may include obtaining user input defining one or more required factors in the multiple authentication factors.

One or more embodiments described in this Specification and/or recited in the claims may not be included in this General Overview section.

BRIEF DESCRIPTION OF THE DRAWINGS

Various aspects of at least one embodiment are discussed below with reference to the accompanying Figures, which are not intended to be drawn to scale. The Figures are included to provide illustration and a further understanding of the various aspects and embodiments, and are incorporated in and constitute a part of this specification, but are not intended to define the limits of the disclosure. In the Figures, each identical or nearly identical component that is illustrated in various Figures is represented by a like numeral. For the purposes of clarity, some components may not be labeled in every figure. In the Figures:

FIGS. 3A-3L illustrate examples of a graphical user interface according to an embodiment.

DETAILED DESCRIPTION

1. System Architecture

Figure 1:
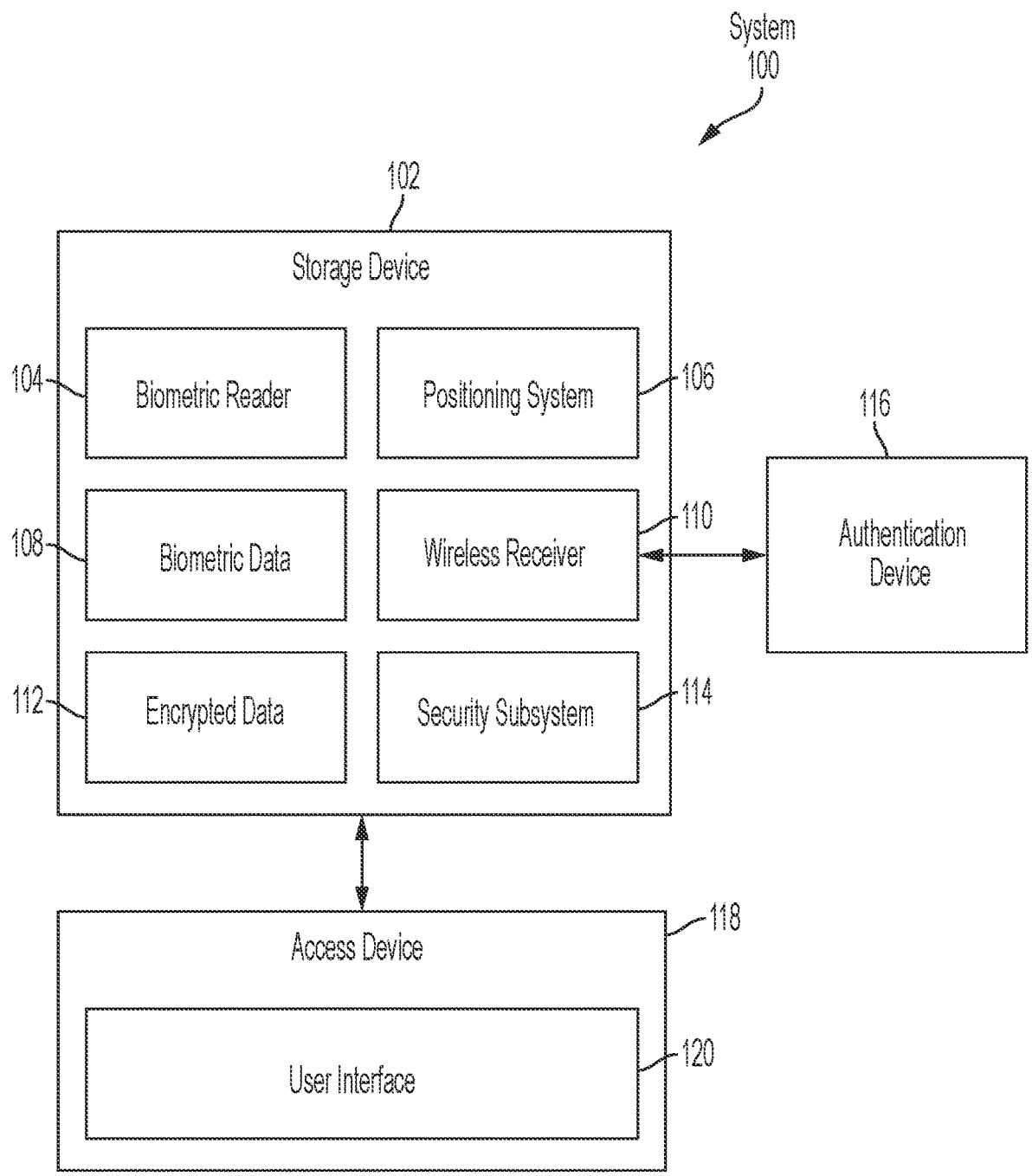
FIG. 1 is a block diagram of an example of a system according to an embodiment.

FIG. 1 is a block diagram of an example of a system 100 according to an embodiment. In an embodiment, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

A storage device 102 may be any kind of device, or set of devices, on which data is to be stored and secured from unauthorized access. For example, a storage device 102 may include a hard disk drive (HDD), solid state drive (SSD), persistent memory, disc drive (e.g., compact disc (CD) or digital video disc (DVD)), universal serial bus (USB) flash memory, and/or another kind of storage device or combination thereof. In some examples, a storage device 102 may include multiple physical devices operatively connected by an abstraction layer, such as multi-drive network-attached storage (NAS), cloud storage, a data center, distributed storage in a local area network (LAN), peer-to-peer sharing infrastructure, etc. The storage device 102 may be a removable device (i.e., a device that is removable and portable between access devices, such as a USB stick or external SSD) or a fixed device (i.e., a device installed within an access device, such as within a NAS device, rack server, laptop, desktop, tablet, smartphone, etc.). In general, techniques described herein may apply to any kind of storage system in which data is to be stored and secured.

The storage device 102 may include one or more biometric readers 104. A biometric reader 104 refers to a set of hardware, controlled at least in part by software and/or firmware, configured to obtain biometric data 108 from a user. Biometric data 108 may include, for example, one or more of: a fingerprint scan; an eye scan (e.g., iris and/or retina data); a facial scan; a nucleic acid sequence (e.g., obtained from blood, saliva, or another source); an otic response (e.g., representing one or more responses from a user's ear canal at a particular frequency or range of frequencies); voice data; and/or another kind of biometric data or combination thereof. The storage device 102 may be configured to store biometric data 108 for one or more users authorized to access encrypted data 112 stored by the storage device 108. Alternatively or additionally, the storage device 102 may be configured to obtain biometric data 108 from an external biometric reader 104, i.e., a biometric reader 104 that is not part of the secure storage device 102 itself. For example, an access device 118 may include a biometric reader 104.

The storage device 102 may include one or more positioning systems 106. A positioning system 106 refers to a set of hardware, controlled at least in part by software and/or firmware, configured to determine an approximate position of the storage device 102. For example, a positioning system 106 may be a global positioning system (GPS), a short-range positioning system (e.g., using Bluetooth®, Wi-Fi, and/or another short-range signaling system or combination thereof), or another kind of positioning system. In some examples, a positioning system 106 provides high-resolution positioning data. For example, a positioning system 106 may include a "dead-reckoning" (DR) GPS chip, capable of providing positional accuracy on a scale of meters, centimeters, or another relatively precise scale. The GPS may be configured to determine an altitude of the storage device 102. Alternatively or additionally, the storage device 102 may include an altimeter, atmospheric pressure sensor, and/or other component configured to measure or approximate an altitude of the storage device 102. As described herein, the storage device 102 may use the approximate position of the storage device 102 as an authentication factor for accessing secured data.

The storage device 102 may include one or more wireless receivers 110. A wireless receiver 110 refers to a set of hardware, controlled at least in part by software and/or firmware, configured to receive information wirelessly from one or more devices external to the storage device. The wireless receiver 110 may be a wireless transceiver that is also capable of transmitting data to an external device. The wireless receiver 110 may be configured to detect the presence of an authentication device 116, within a supported range (e.g., operating distance or radius) of the wireless receiver 110. For example, the authentication device 116 may be a near-field communication (NFC) device, Bluetooth® device, or other kind of device configured to supply its identity to the wireless receiver 110 when in relatively close proximity to the wireless receiver 110 and/or when requested by the wireless receiver 110. Presence of the authentication device 116 in relative proximity to the storage device 102 may serve as an authentication factor as described herein.

In an embodiment, the storage device 102 includes a security subsystem 114. The security subsystem 114 is a set of hardware, software, and/or firmware configured to execute data encryption and decryption operations as described herein. Specifically, the security subsystem 114 uses one or more authentication factors (e.g., biometric data 108, position data, presence of one or more authentication devices 116, one or more passwords and/or personal identification numbers (PINs), and/or another authentication factor or combination thereof) to secure data. The storage subsystem 114 may use one or more authentication factors as an encryption/decryption key. For example, given a digital representation of one or more users' fingerprint(s) and/or other biometric credential, the storage device 102 may use that digital representation as a key for encrypting data. The same fingerprint(s) and/or other biometric credential may then be required as a key to decrypt the data. Using an authentication factor (e.g., a fingerprint) as an encryption/decryption key is more secure than systems that only require one or more authentication factors to access data, but use a separate key (which may be accessible by third parties) for encryption/decryption.

An access device 118 is a device used to store data, access data, and/or manage users of the storage device 102, responsive to user input to a user interface 120. For example, if the storage device 102 is a USB flash drive, the access device 118 may be a device that includes one or more USB ports into which the storage device 102 can be inserted. Many different kinds of access devices 118 may be used, depending on the kind of storage device 102 used. Alternatively, the storage device 102 may itself include a user interface 120. For example, the storage device 102 may include a built-in screen and one or more hardware interfaces (e.g., a haptic interface, microphone, keyboard, etc.) for receiving user input. The storage device 102 includes a set of instructions for presenting the user interface 120. For example, the storage device 102 may include executable code that generates instructions for rendering the user interface 120, hypertext markup language (HTML) accessible by a web browser, and/or another kind of instructions for presenting the user interface 120.

In general, a user interface 120 renders user interface elements and receives input via user interface elements. A user interface 120 may be a graphical user interface (GUI), a command line interface (CLI), a haptic interface, a voice command interface, and/or any other kind of interface or combination thereof. Examples of user interface elements include checkboxes, radio buttons, dropdown lists, list boxes, buttons, toggles, text fields, date and time selectors, command lines, sliders, pages, and forms. Different components of the user interface 120 may be specified in different languages. The behavior of user interface elements may be specified in a dynamic programming language, such as JavaScript. The content of user interface elements may be specified in a markup language, such as hypertext markup language (HTML), Extensible Markup Language (XML), or XML User Interface Language (XUL). The layout of user interface elements may be specified in a style sheet language, such as Cascading Style Sheets (CSS). Alternatively or additionally, aspects of a user interface 120 may be specified in one or more other languages, such as Java, Python, Perl, C, C++, and/or any other language or combination thereof.

Components of the system 100 may be implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

2. Securing Data Using A Secure Storage Device

Figure 2:
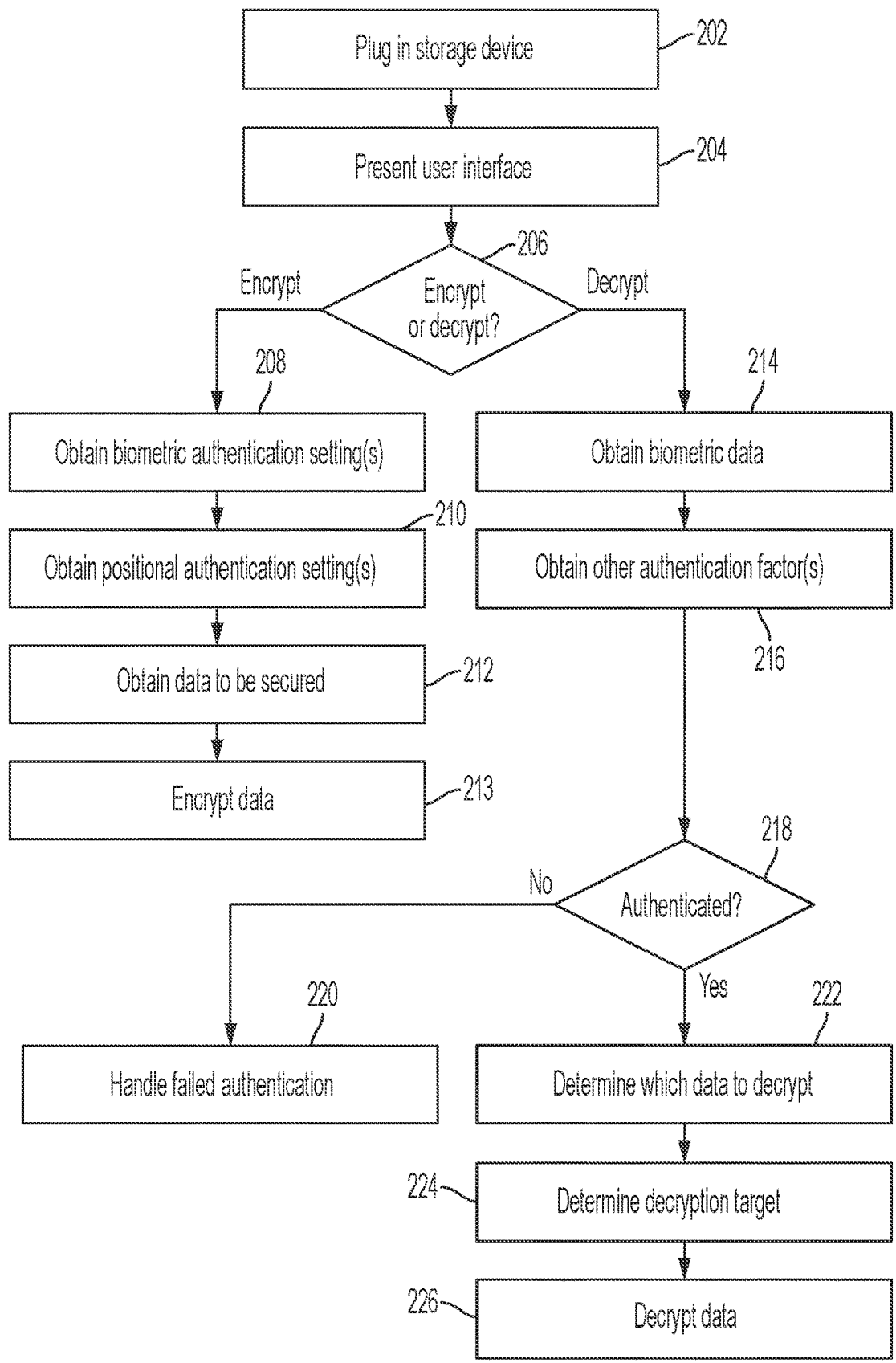
FIG. 2 is a flow diagram of an example of operations for securing data using a secure storage device according to an embodiment.

FIG. 2 is a flow diagram of an example of operations for securing data using a secure storage device according to an embodiment. One or more operations illustrated in FIG. 2 may be modified, rearranged, or omitted all together. Accordingly, the particular sequence of operations illustrated in FIG. 2 should not be construed as limiting the scope of one or more embodiments.

The following discussion is facilitated by reference to the example graphical user interfaces illustrated in FIGS. 3A-3L. The graphical user interfaces illustrated in FIGS. 3A-3L should be understood as examples that may not be applicable to one or more embodiments. Accordingly, examples described below should not be construed as limiting the scope of one or more embodiments.

In an embodiment, the secure storage device is a removable device. A user may plug in the device (Operation 202), for example, by inserting a USB flash drive into a USB port, connecting the cable of a removable drive, etc. Once the secure storage device is plugged in and ready (e.g., mounted by the local file system), the secure storage device presents a user interface (Operation 204) providing access to functionality of the secure storage device. For example, the secure storage device may present a user interface by providing HTML code that, when opened in a web browser (e.g., at the uniform resource locator (URL) http://usb.local), presents options for accessing features of the secure storage device. The user interface may include options to encrypt new data and/or decrypt data that is already stored on the secure storage device.

Figure 3A:
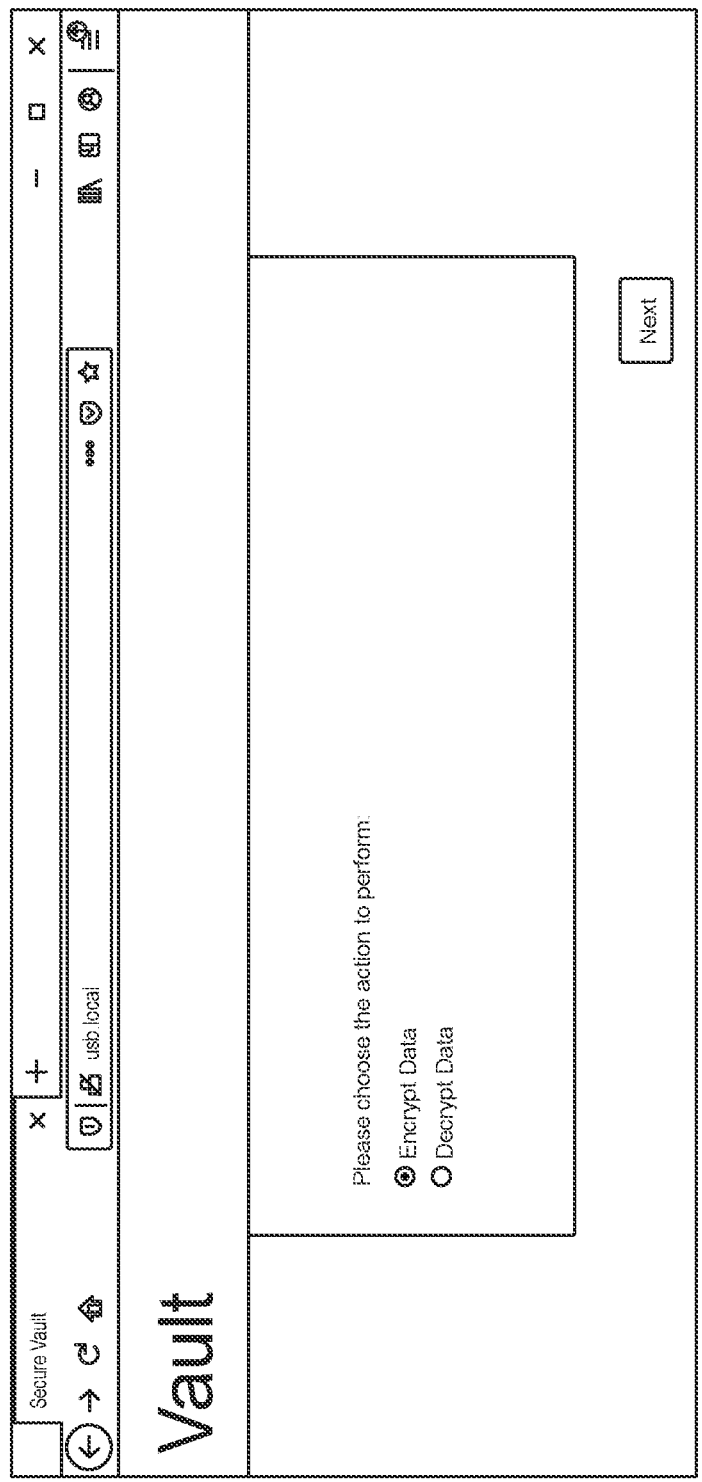
Figure 3C:
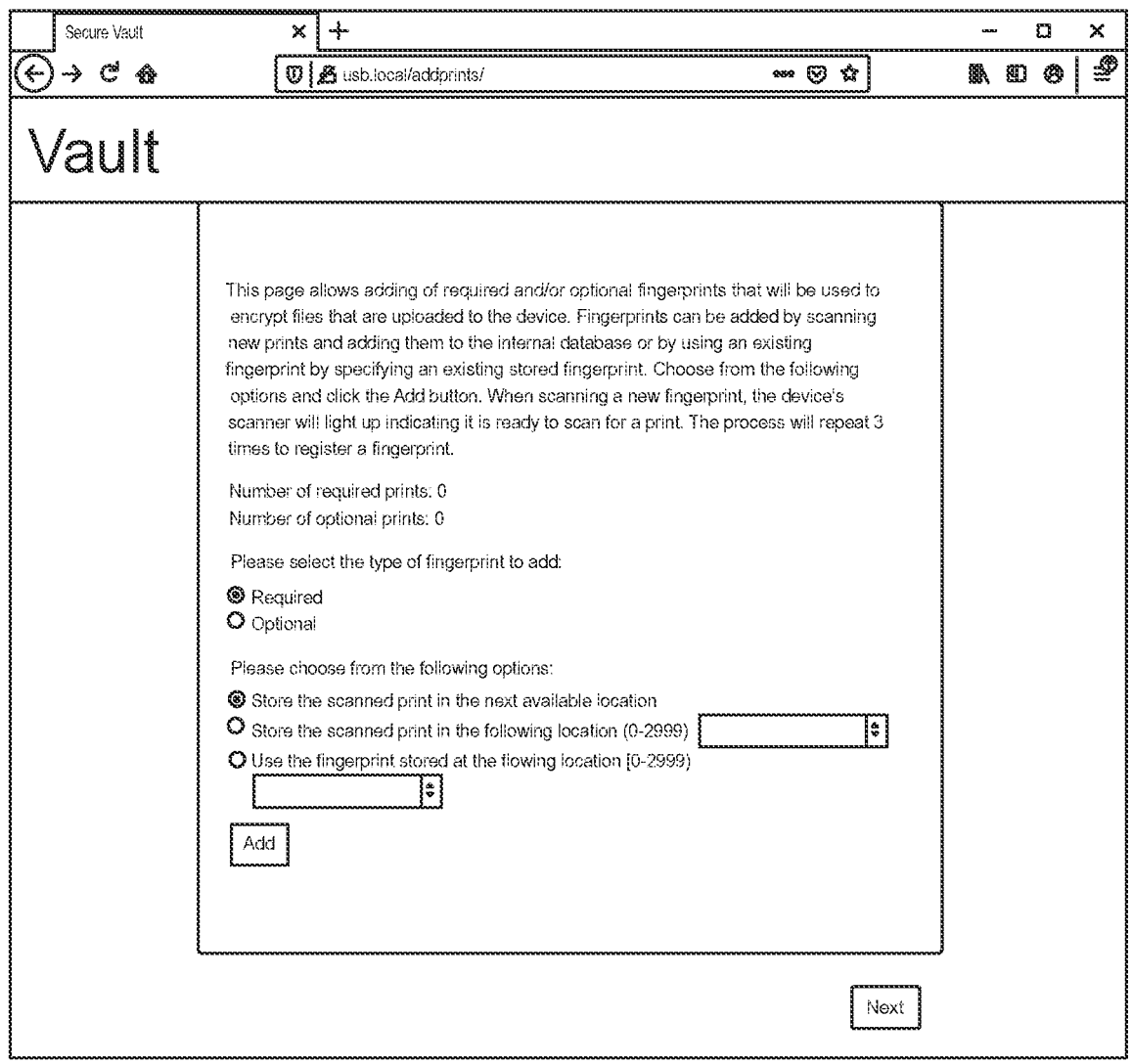

A user may provide input to the user interface (Operation 206), indicating which functionality to use. FIG. 3A illustrates an example of a user interface in which a user has selected to encrypt data. FIG. 3H (discussed in further detail below) illustrates an example of a user interface in which a user has selected to decrypt data. Responsive to user input indicting which functionality to use, the storage device presents another user interface (e.g., a different web page) with the corresponding functionality.

If the user chooses to encrypt data, the secure storage device may proceed to obtain settings and associated data used to encrypt and secure the data. FIG. 3B illustrates an example of a user interface for obtaining settings and associated data used to encrypt and secure the data, according to an embodiment. In this example, the user interface includes controls that allow a user to:

indicate which authentication factor(s) to use for each user, with buttons/links to configure the selected option (s) for each user (e.g., obtaining fingerprints, as discussed below with reference to FIG. 3C);

indicate whether positional authentication ("geolocation") is required, with button/link to initiate configuration of positional authentication (e.g., as discussed below with reference to FIGS. 3D and 3E);

indicate which data is to be encrypted, in this example by browsing the access device's file system (e.g., as discussed below with reference to FIGS. 3F and 3G);

when configuration is complete, initiate data encryption and upload to the secure storage device; and view information about the encryption process, such as the number and size of the file(s) selected for encryption, which authentication factor(s) still need to be configured before encryption can proceed, etc.

As illustrated in FIG. 3B, the secure storage device may be configured to support required and/or optional users (i.e., store biometric data corresponding to those users). A required user must be present to decrypt the data. An optional user's presence is not mandatory; however, a certain number of optional users may need to be present (e.g., two of five users designated as optional). The user interface may allow a user to indicate a specific configuration of required user(s) (if any) and/or optional user(s) (if any) needed to decrypt the data. Alternatively or additionally, the user interface may allow a user to indicate a specific configuration of required authorization device(s) (if any) and/or optional authorization device(s) (if any) needed to encrypt the data.

In an embodiment, the secure storage device obtains one or more biometric authentication settings (Operation 208). Biometric authentication settings indicate which biometric data is needed for decryption. In addition, the secure storage device may prompt a user to provide biometric data, e.g., via a fingerprint scanner and/or other biometric reader. FIG. 3C illustrates an example of a graphical user interface for obtaining biometric authentication settings. In this example, the graphical user interface allows a user to designate fingerprint authentication settings, and optionally to provide one or more fingerprints via a fingerprint scanner.

The secure storage device may be configured to obtain and store biometric data in various ways. For example, the secure storage device may store biometric data at indexed locations, with each index corresponding to a particular instance of biometric data (e.g., a fingerprint for a particular user). In the example illustrated in FIG. 3C, the secure storage device can store up to 3,000 fingerprints, each accessible at a respective index ranging from 0 to 2,999. The number of fingerprints and/or other data may be limited, at least in part, by the amount of available storage on the device. Given sufficient memory, the storage device may be able to store an index having potentially millions of entries (most of which may store "dummy" data as described below), further increasing the difficulty of unauthorized access. When obtaining biometric data from a user (e.g., via a fingerprint scan), the secure storage device may be configured to store the biometric data at the next available index or at a random index that is not yet allocated to a user. Alternatively or additionally, the secure storage device may provide an option to store the biometric data at a user-specified index within the supported range. Storage locations at indexes that have not yet been used may be pre-populated with "dummy" biometric data, thus helping to thwart unauthorized entities who might attempt to recover and use the stored biometric data. Alternatively or additionally, the secure storage device may allow a user to select biometric data that is already stored at a particular index. For example, if user A wants data to be decryptable only when user B is present, and knows which index corresponds to user B's biometric data, user A may use reference that index to designate that user as "required." User A may also provide their own biometric data as required or optional.

In an embodiment, the secure storage device obtains one or more positional authentication setting(s) (Operation 210). Positional authentication settings indicate a positional requirement, i.e., a required location of the secure storage device, for decrypting the data. For example, a positional authentication setting may designate that the secure storage device must be in a particular geographic area, building, room, etc. Depending on the precision of the positioning system, a positional authentication setting may even indicate a particular location within a room. Alternatively or additionally, positional authentication may be based on altitude. For example, authentication may require the secure storage device to be located at an altitude only achievable by aircraft, so that the data cannot be decrypted on the ground. Alternatively or additionally, positional authentication may be associated with a "logical" location, i.e., a defined location that does not have fixed geographic coordinates. For example, a logical location may correspond to the interior of a particular vehicle (e.g., by communicating with one or more transponders within that vehicle), so that the data cannot be decrypted when the secure storage device is removed from the vehicle (and, in some examples, can never be decrypted if the vehicle is destroyed).

Figure 3D:
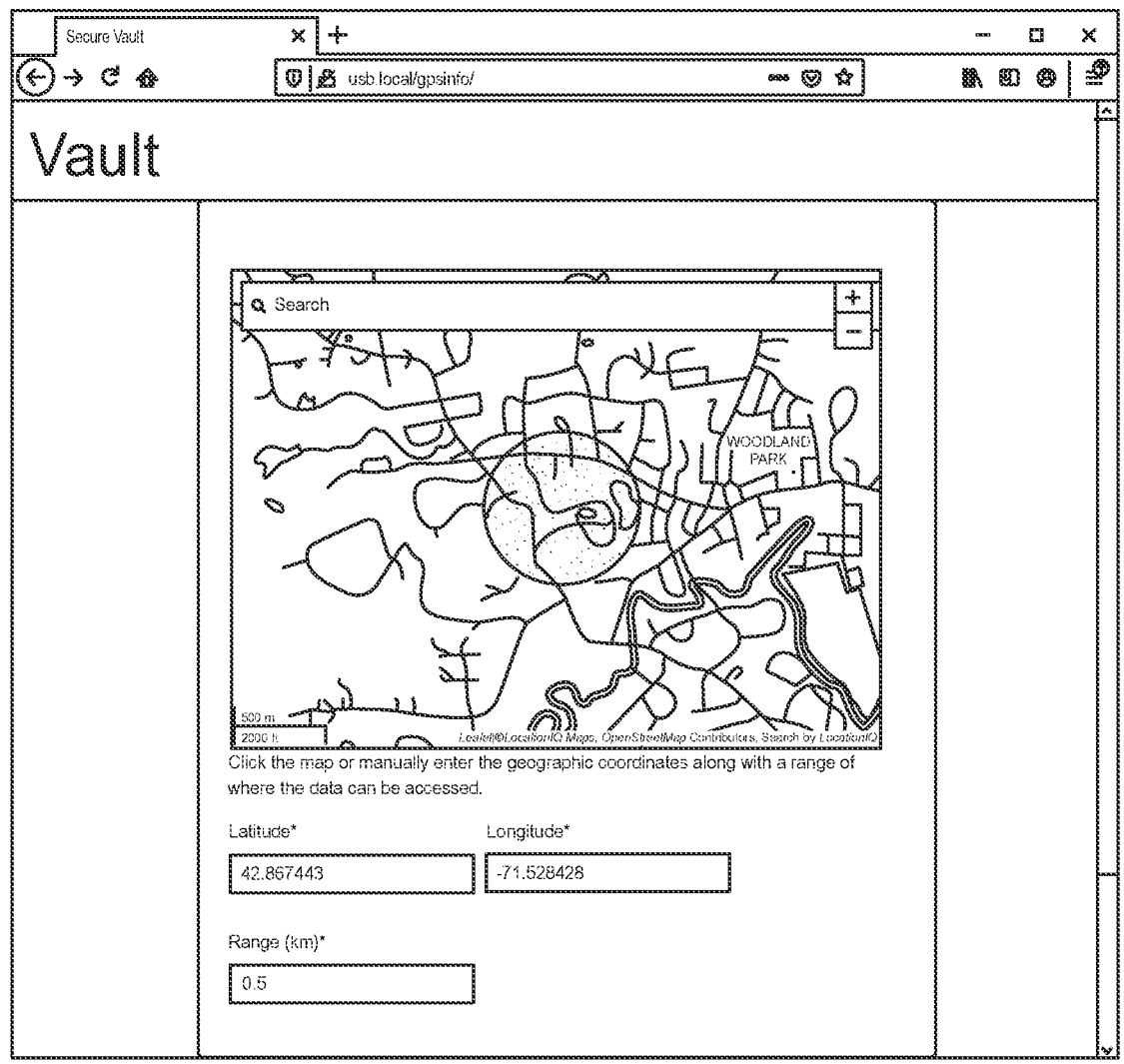
Figure 3E:
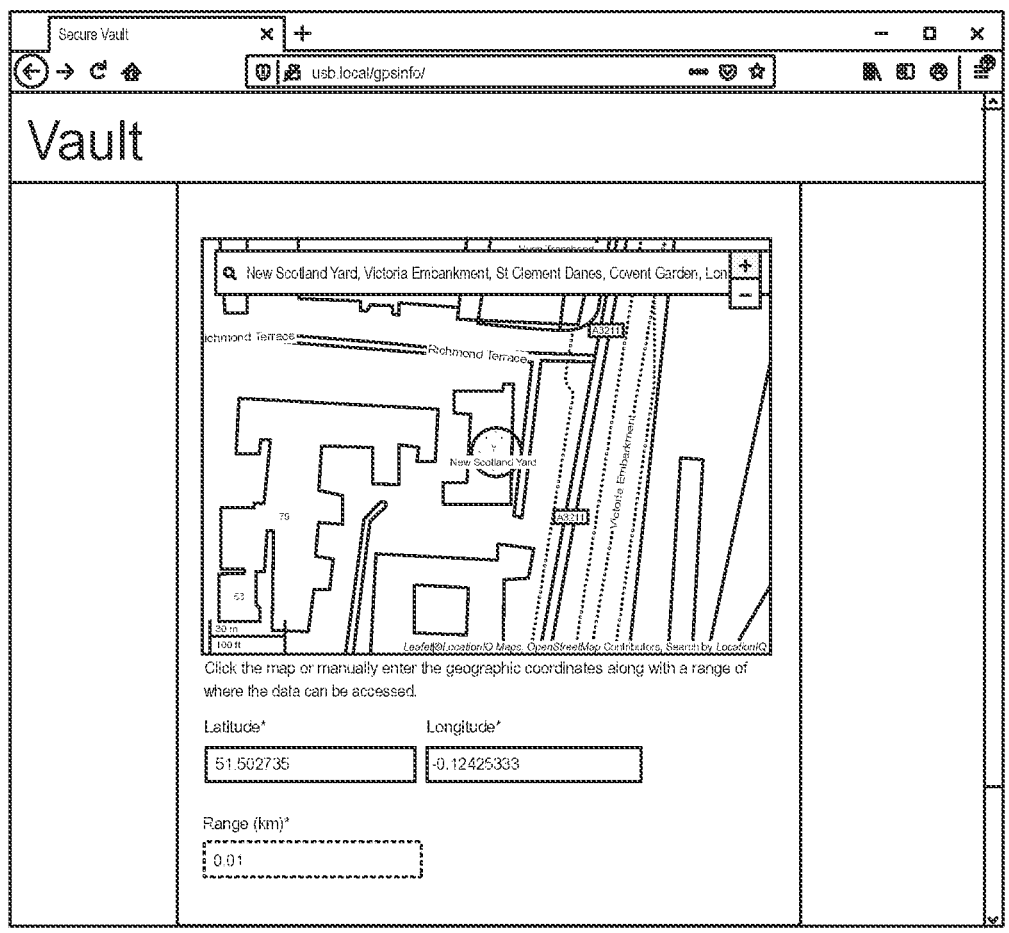
Figure 3F:
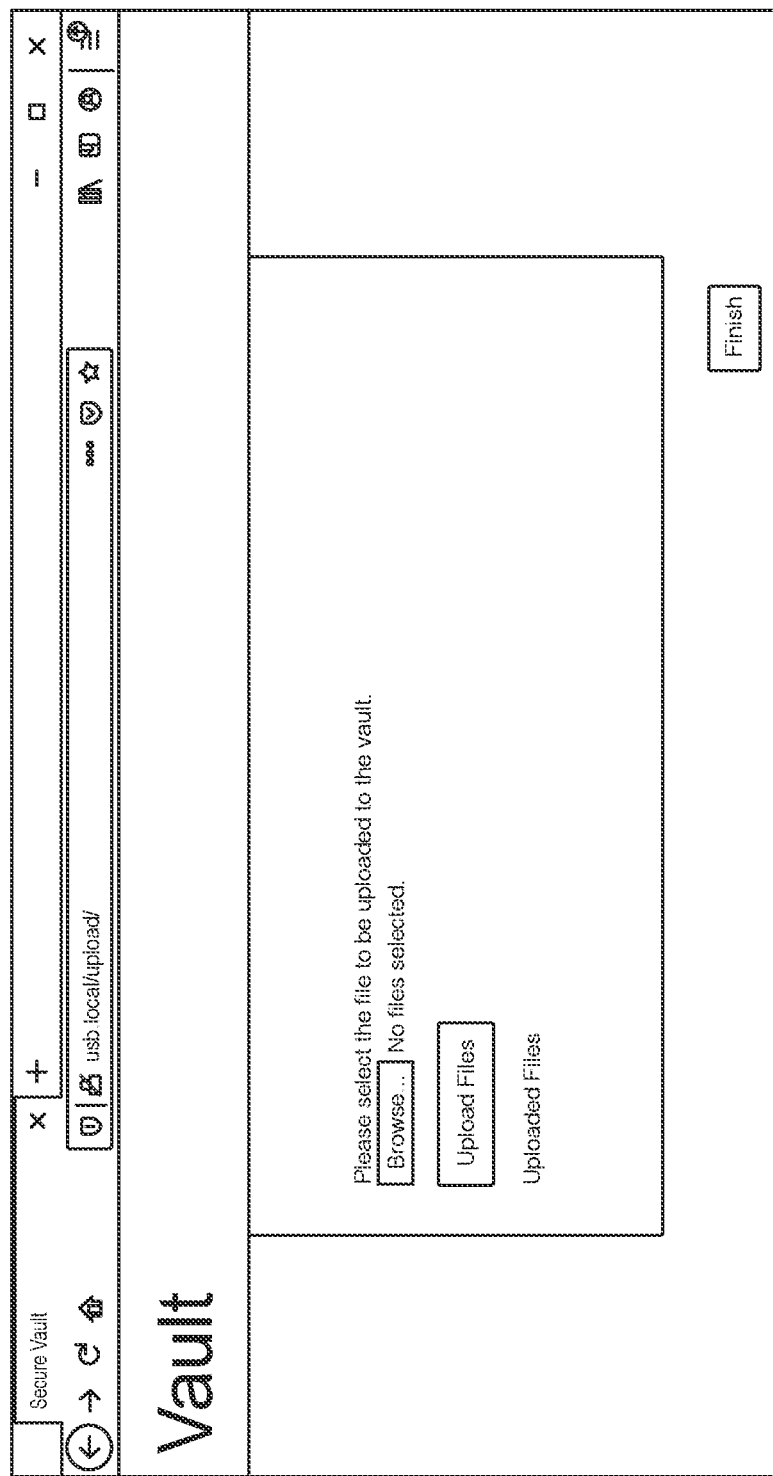
Figure 3G:
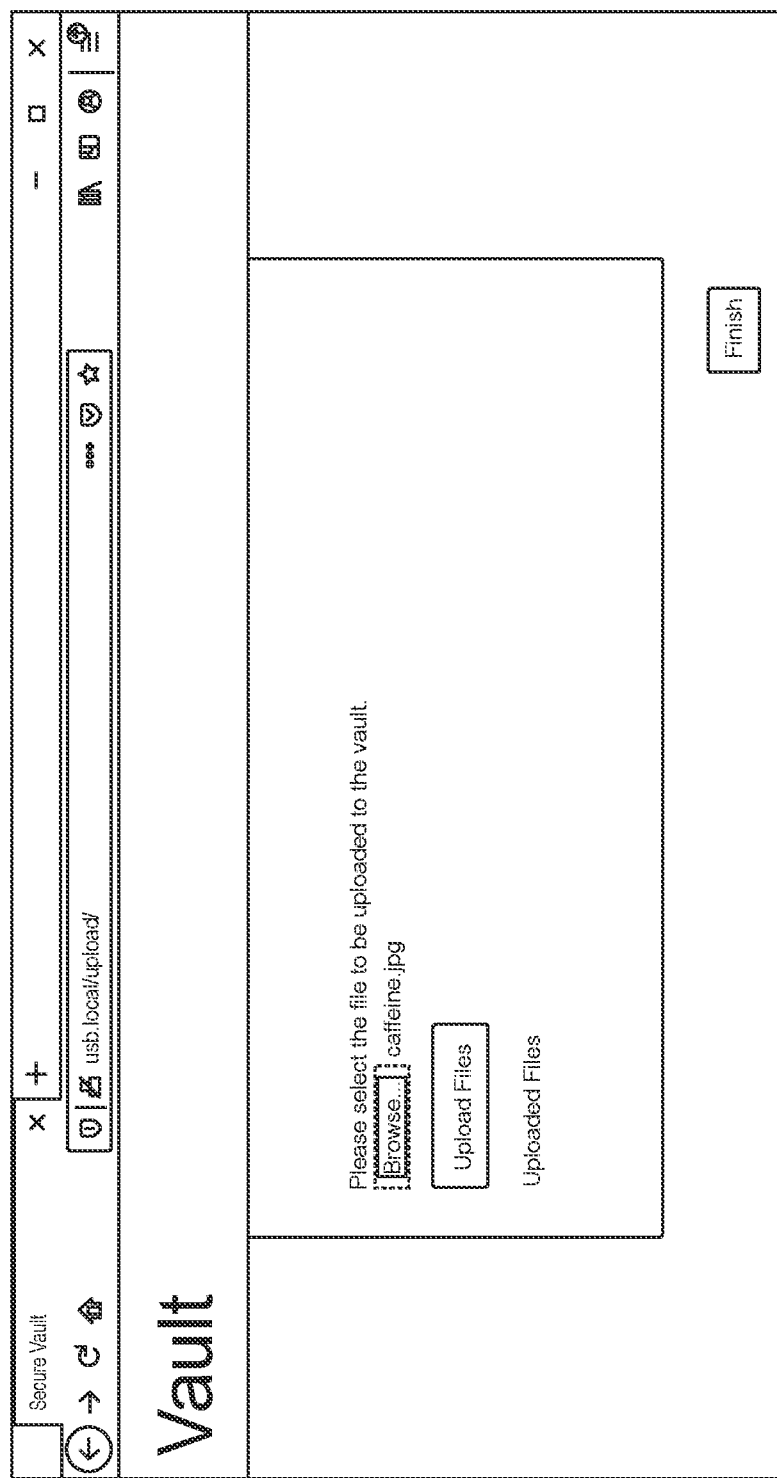
Figure 3H:
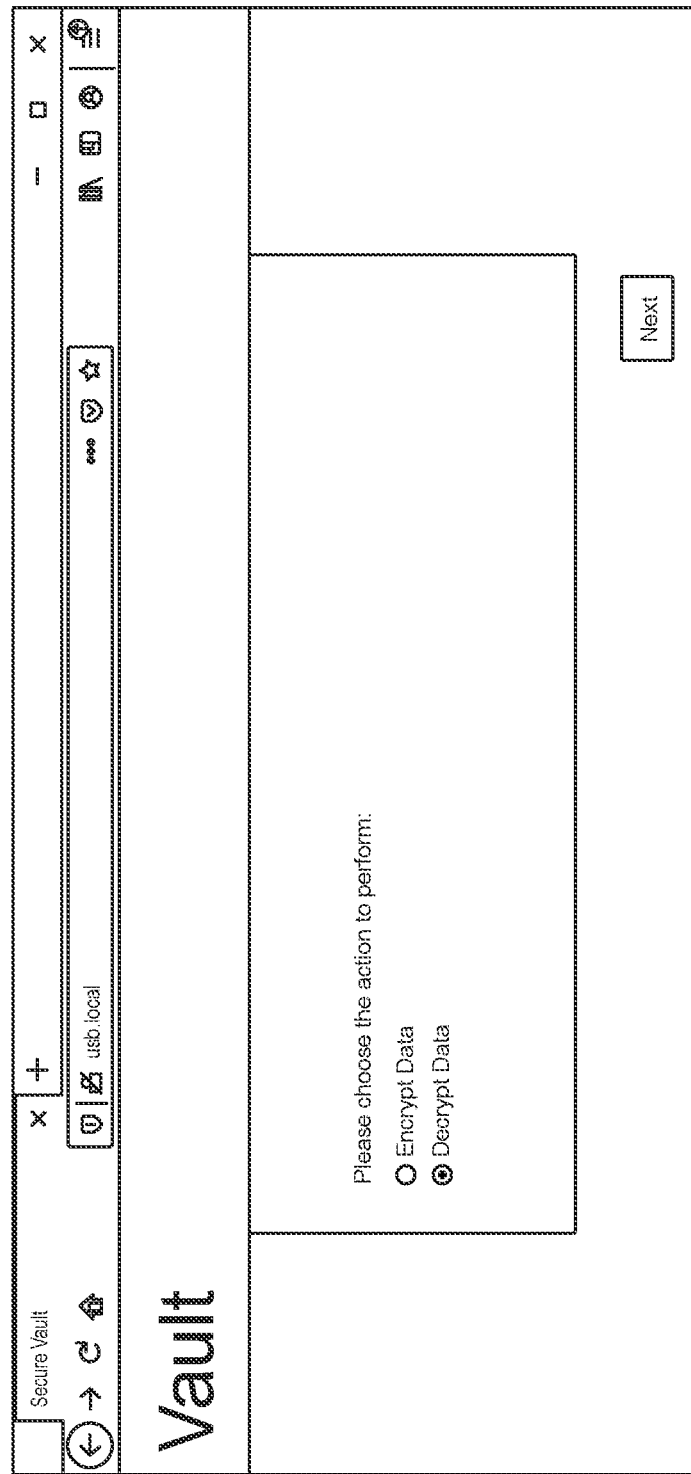

FIG. 3D illustrates an example of a graphical user interface for obtaining positional authentication settings. In this example, a user may designate a location on a map and/or manually enter geographic coordinates. The user may also select a geographic range, e.g., a radius surrounding the designated location, within which the secure storage location must be located to decrypt the data. The secure storage device may default to its current location and a default range surrounding that location. FIG. 3E illustrates another example of a graphical user interface for obtaining positional authentication settings. In this example, a user has manually entered an address (in this example, the address of New Scotland Yard in London, England) and a smaller range than the default range. The secure storage device may require a user-selected range to be within a range supported by the positioning system. Alternatively, other geofencing techniques may be used to designate a positional authentication setting.

In an embodiment, the secure storage device obtains the data to be secured (Operation 212). Specifically, the secure storage device provides an interface that allows a user to select the data to be stored and secured in the secure storage device. FIG. 3F illustrates an example of a graphical user interface for obtaining data. In this example, the graphical user interface includes controls for browsing to a particular storage location (e.g., a storage location in the access device) and designating one or more data items (e.g., files) to be uploaded to the secure storage device. Alternatively or additionally, the graphical user interface may support drag-and-drop functionality, an interface for capturing multimedia (e.g., a photograph, video, and/or still image) from one or more sensors (e.g., a camera and/or microphone) operatively coupled with the secure storage device (e.g., as part of an access device), a textbox for providing a file URL, and/or another mechanism for obtaining the data. In an example illustrated in FIG. 3G, the secure storage device has obtained a file named "caffeine.jpg."

After obtaining the data to be secured, the secure storage device may encrypt the data (Operation 213) in various ways. As noted above, the secure storage device may use one or more authentication factors as an encryption key. Examples of encryption techniques include but are not limited to: Triple Data Encryption Algorithm (DEA) or Triple Data Encryption Standard (DES); Advanced Encryption Standard (AES); Rivest-Shamir-Adleman (RSA); Blowfish; Twofish; and Format Preserving Encryption (FPE).

Returning to the options initially presented to a user, if the user selects to decrypt data (e.g., as illustrated in FIG. 3H), the secure storage device may obtain biometric data from one or more users (Operation 214). Alternatively or additionally, the secure storage device may obtain one or more other authentication factors (Operation 216), such as the secure storage device's current location, whether any required and/or optional authentication device(s) is/are present, a user password and/or PIN (e.g., an alphanumerical string and/or numerical PIN code), etc. In some examples, multiple users each supply part of an aggregate password or PIN code. For example, three different users may each supply 8 characters of a 24-character password. In this example, the users may need to supply their respective parts in the correct order to form the full password. Alternatively or additionally, the storage device may be configured to obtain part or all of a password or PIN code from a remote user, i.e., a user who is not physically present but nonetheless contributes to authentication. To obtain data from a remote user, the storage device may be configured to negotiate a secure connection with a remote device operated by that user. Negotiating the secure connection may require its own set of one or more authentication procedures. If biometric data is required from multiple users (e.g., a certain number of required users and/or a certain number of optional users), the process of obtaining biometric data may be repeated for each user, until the requirements are satisfied.

Different authentication factors may be provided by different users. For example, one user may be required to provide a password while another user is required to provide a fingerprint and still another user is required to supply an authentication device. In some examples, authentication factors are required to be provided in a particular order. For example, three required fingerprints may need to be provided in a particular order; providing the correct fingerprints in the wrong order may fail authentication. Requiring a specific order can help protect against unauthorized entities somehow gaining access to authentication factors, for example, compelling a user to supply their fingerprint. As noted above, the specific configuration of requirements for decrypting data may be specified via a user interface of the secure storage device.

Figure 3I:
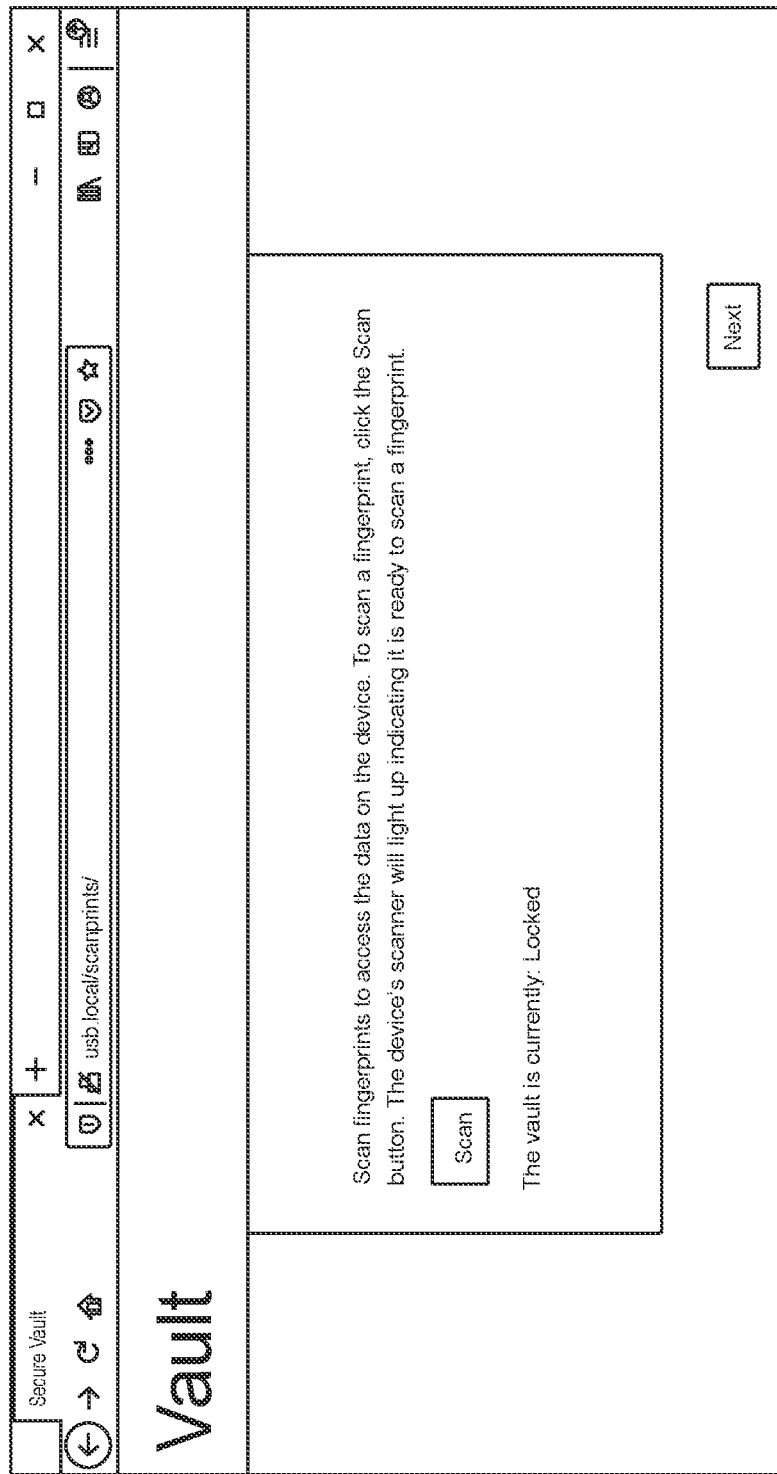

FIG. 3I illustrates an example of a graphical user interface for obtaining biometric data, in this example fingerprints. In this example, a "scan" button initiates a process of scanning a fingerprint using a fingerprint scanner. In addition, the graphical user interface indicates the current status of authentication (e.g., "locked," indicating that sufficient credentials have not yet been supplied). As illustrated in FIG. 3I, the secure storage device may not indicate whose fingerprint(s) is/are required, whose fingerprint(s) is/are optional, etc. Alternatively or additionally, the secure storage device may not indicate any positional requirement and/or other authentication factor(s) needed to decrypt the data. Obfuscating the specific decryption requirement(s) increases security by making it harder for unauthorized parties to know how to direct their intrusion efforts.

Figure 3J:
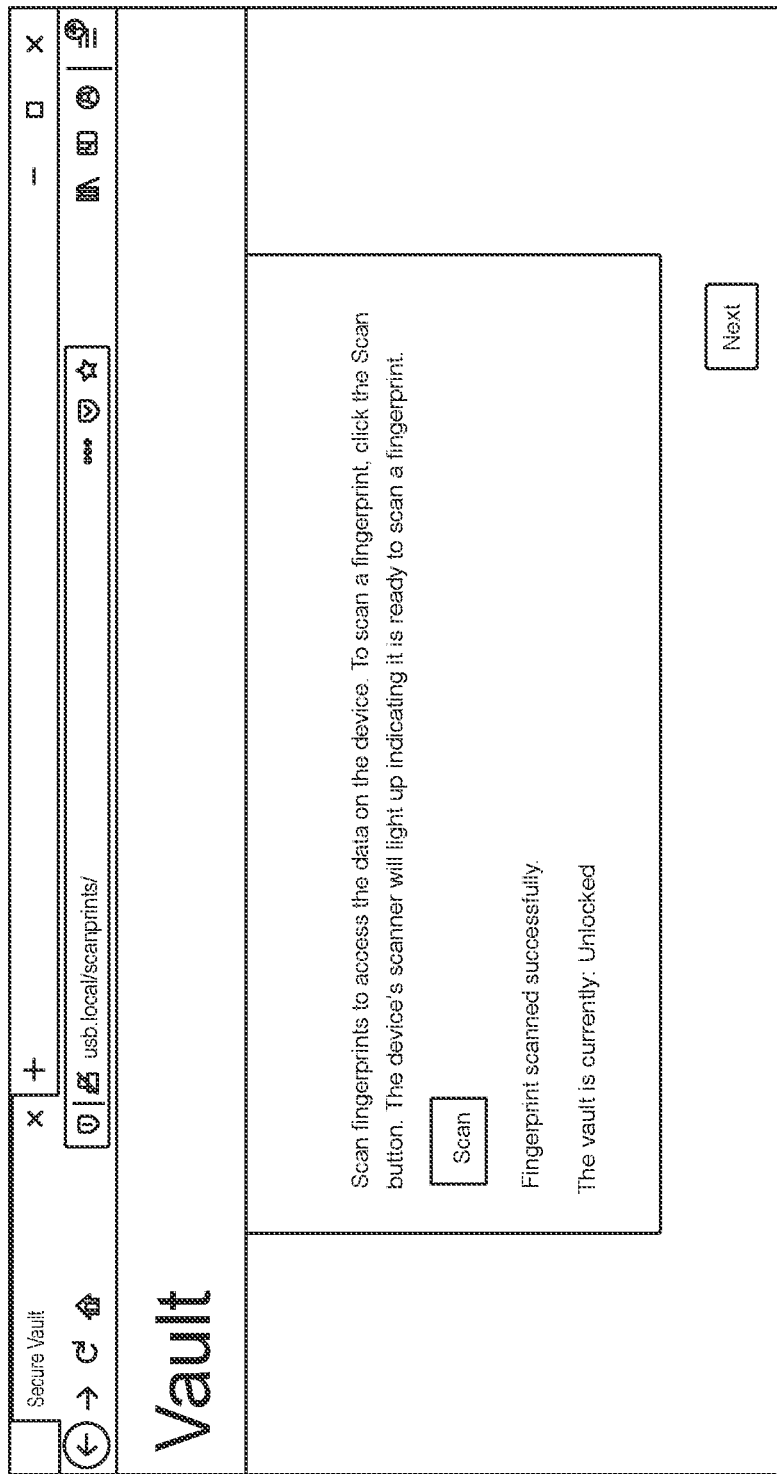

In an embodiment, based on the authentication factor(s) provided or otherwise obtained, the secure storage device determines whether authentication is successful (Operation 218). FIG. 3J illustrates an example of a graphical user interface indicating that authentication is successful (i.e., the data is "unlocked"). If authentication is unsuccessful, the secure storage device may handle the failed authentication (Operation 220) in various ways. For example, the secure storage device may generate an alert indicating that authentication was not successful. Alternatively or additionally, the secure storage device may present an interface that gives access only to unencrypted contents (if any) of the secure storage device and/or present fake/dummy data designed to give a false impression of successful authentication. Alternatively or additionally, the secure storage device may corrupt or destroy the encrypted data after a threshold number of failed authentication attempts. As noted above, the secure storage device may obfuscate the specific authentication requirements; alternatively, the secure storage device may provide information indicating why authentication failed, i.e., which authentication factor(s) was/were missing or otherwise insufficient.

Figure 3K:
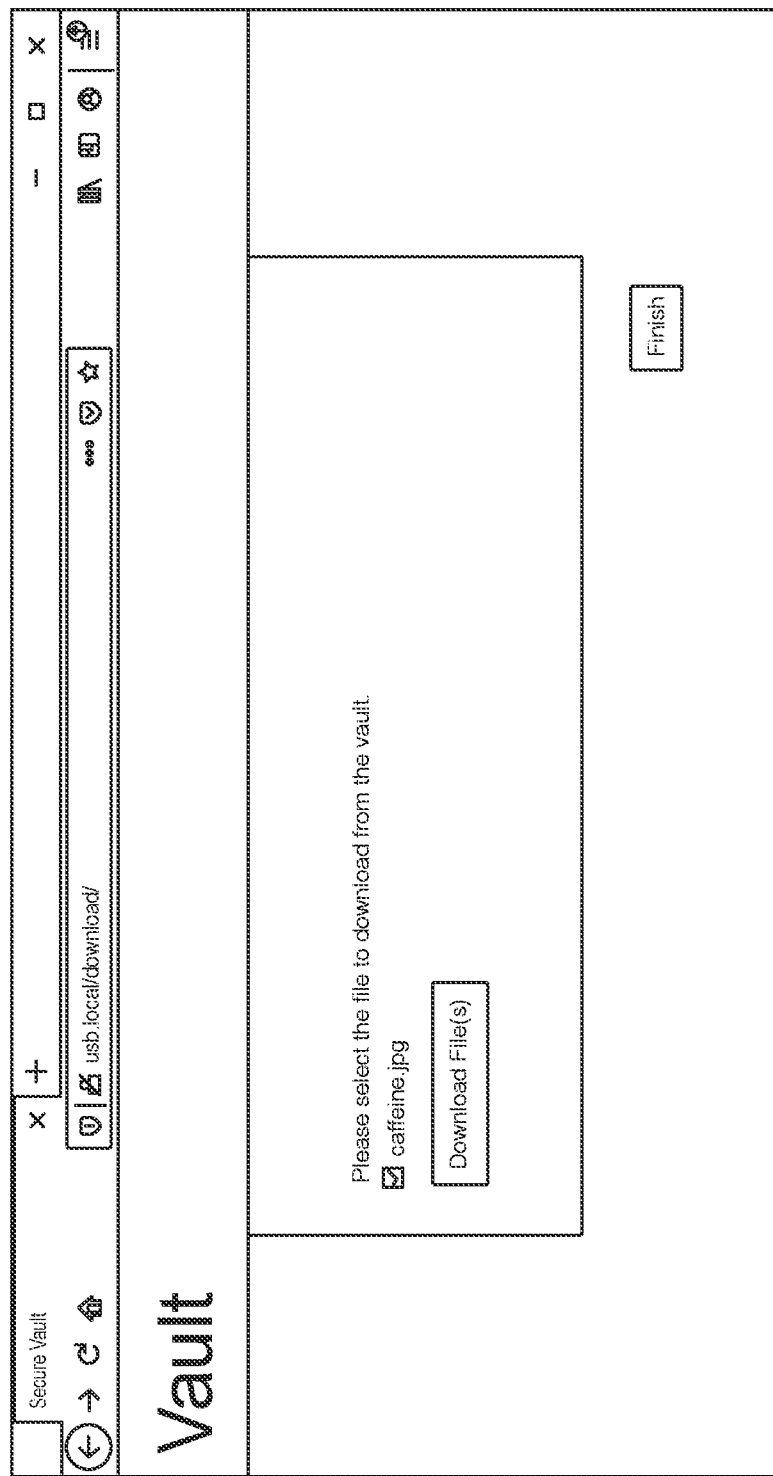

In an embodiment, if authentication is successful, the secure storage device determines which data to decrypt (Operation 222). To determine which data to decrypt, the secure storage device may present a user interface indicating which data is available to decrypt. The data available to decrypt may depend on the specific authentication factor(s) provided. That is, the secure storage device may be configured to store multiple sets of data, each with their own decryption requirements, which are not visible to users who do not satisfy those requirements. FIG. 3K illustrates an example of a graphical user interface for determining which data to decrypt. In this example, the graphical user interface includes a list of one or more files available to decrypt, with user interface controls allowing a user to select which of the file(s) to decrypt.

In an embodiment, the secure storage device determines a decryption target (Operation 224). The decryption target may be a location in storage and/or memory of the access device. The secure storage device may be configured to stream the decrypted data to the decryption target, so that the data is never decrypted at rest in persistent storage on the secure storage device itself. When streaming decrypted data, the storage device may only store decrypted data (in whole or in part) in random access memory (RAM) and/or other volatile storage, so that the decrypted data would not survive a power interruption. Avoiding decryption at rest in persistent storage on the secure storage device helps protect against an unauthorized party physically absconding with the secure storage device when authentication is complete and thereby gaining access to the decrypted data.

Figure 3L:
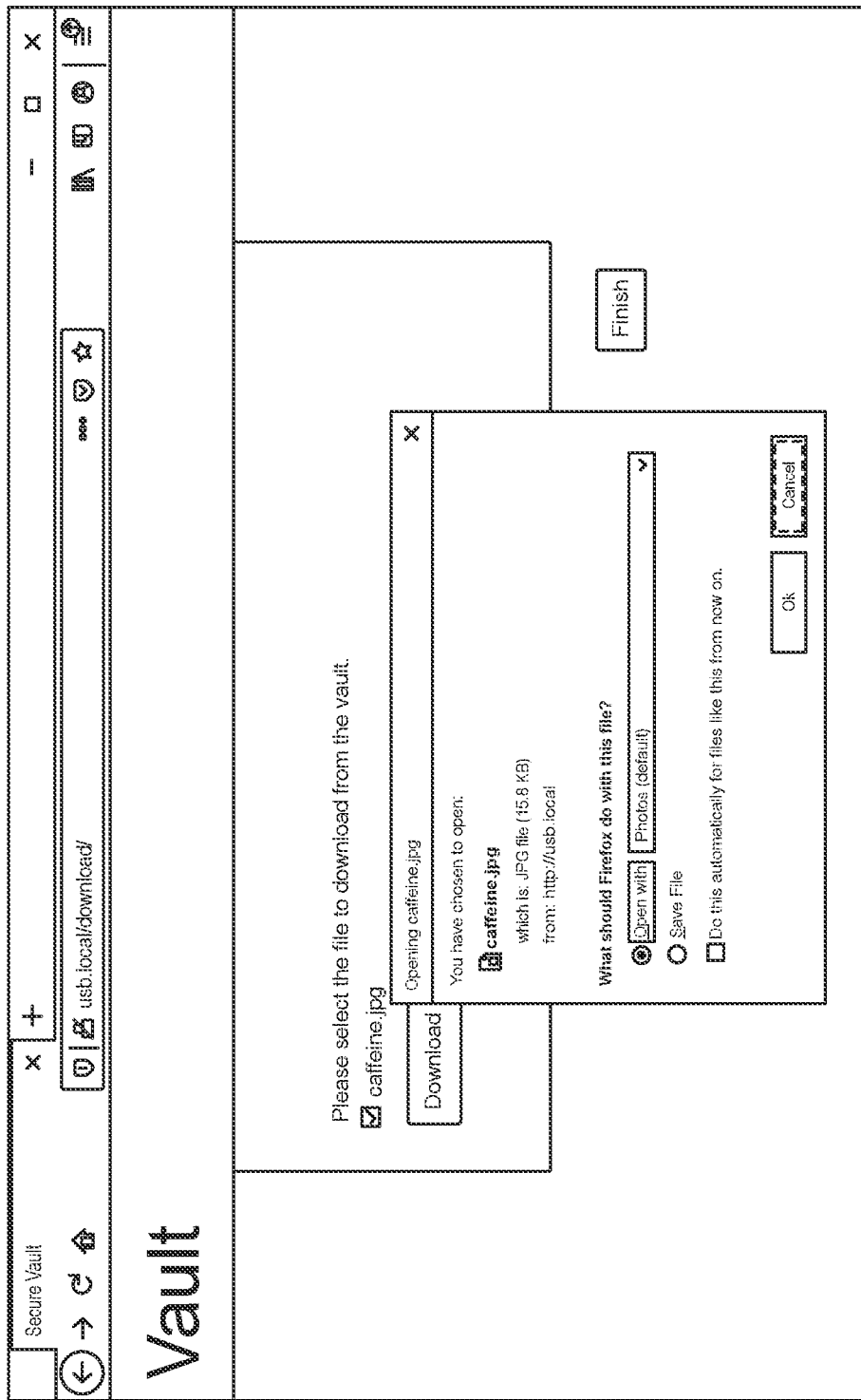

FIG. 3L illustrates an example of a graphical user interface for determining a decryption target. In this example, when a user selects the "download" control, the graphical user interface presents a dialogue allowing the user to select a destination for the decrypted file. Specifically, in this example, the dialogue is a feature of the web browser that allows the user to select one of (a) an application (executed by the access device) to use to open the decrypted file or (b) a storage location for saving the decrypted file. The secure storage device decrypts the data (Operation 226) and provides the decrypted data to the decryption target. Once the data has been decrypted and provided to the decryption target, the secure storage device may be removed (e.g., ejected and/or otherwise disconnected) from the access device.

Techniques described herein allow for securing data within a secure storage device, using multiple authentication factors. In an embodiment, the secure storage device uses 3+ factor authentication, i.e., three or more of (1) something that one or more users know (e.g., a password or PIN code), (2) something that one or more users possess (e.g., an authentication device), (3) something that one or more users are (e.g., biometric data), and/or (4) somewhere that one or more users are (e.g., a positional requirement). A secure storage device as described herein is therefore more secure than prior approaches and data encrypted by the secure storage device may be effectively impenetrable to unauthorized entities.

3. Miscellaneous; Extensions

In an embodiment, a system includes one or more devices, including one or more hardware processors, that are configured to perform any of the operations described herein and/or recited in any of the claims.

In an embodiment, one or more non-transitory computer-readable storage media store instructions that, when executed by one or more hardware processors, cause performance of any of the operations described herein and/or recited in any of the claims.

Any combination of the features and functionalities described herein may be used in accordance with an embodiment. In the foregoing specification, embodiments have been described with reference to numerous specific details that may vary from implementation to implementation. Accordingly, the specification and figures are to be regarded in an illustrative rather than a restrictive sense. The sole and exclusive indicator of the scope of the invention, and what is intended by the Applicant to be the scope of the invention, is the literal and equivalent scope of the set of claims that issue from this application, in the specific form in which such claims issue, including any subsequent correction.

4. Computer Systems; Networks; Cloud Computing

In an embodiment, techniques described herein are implemented by one or more special-purpose computing devices (i.e., computing devices specially configured to perform certain functionality). The special-purpose computing device(s) may be hard-wired to perform the techniques and/or may include digital electronic devices such as one or more application-specific integrated circuits (ASICs), field programmable gate arrays (FPGAs), and/or network processing units (NPUs) that are persistently programmed to perform the techniques. Alternatively or additionally, a computing device may include one or more general-purpose hardware processors programmed to perform the techniques pursuant to program instructions in firmware, memory, and/or other storage. Alternatively or additionally, a special-purpose computing device may combine custom hard-wired logic, ASICs, FPGAs, or NPUs with custom programming to accomplish the techniques. A special-purpose computing device may include a desktop computer system, portable computer system, handheld device, networking device, and/or any other device(s) incorporating hard-wired and/or program logic to implement the techniques.

Figure 4:
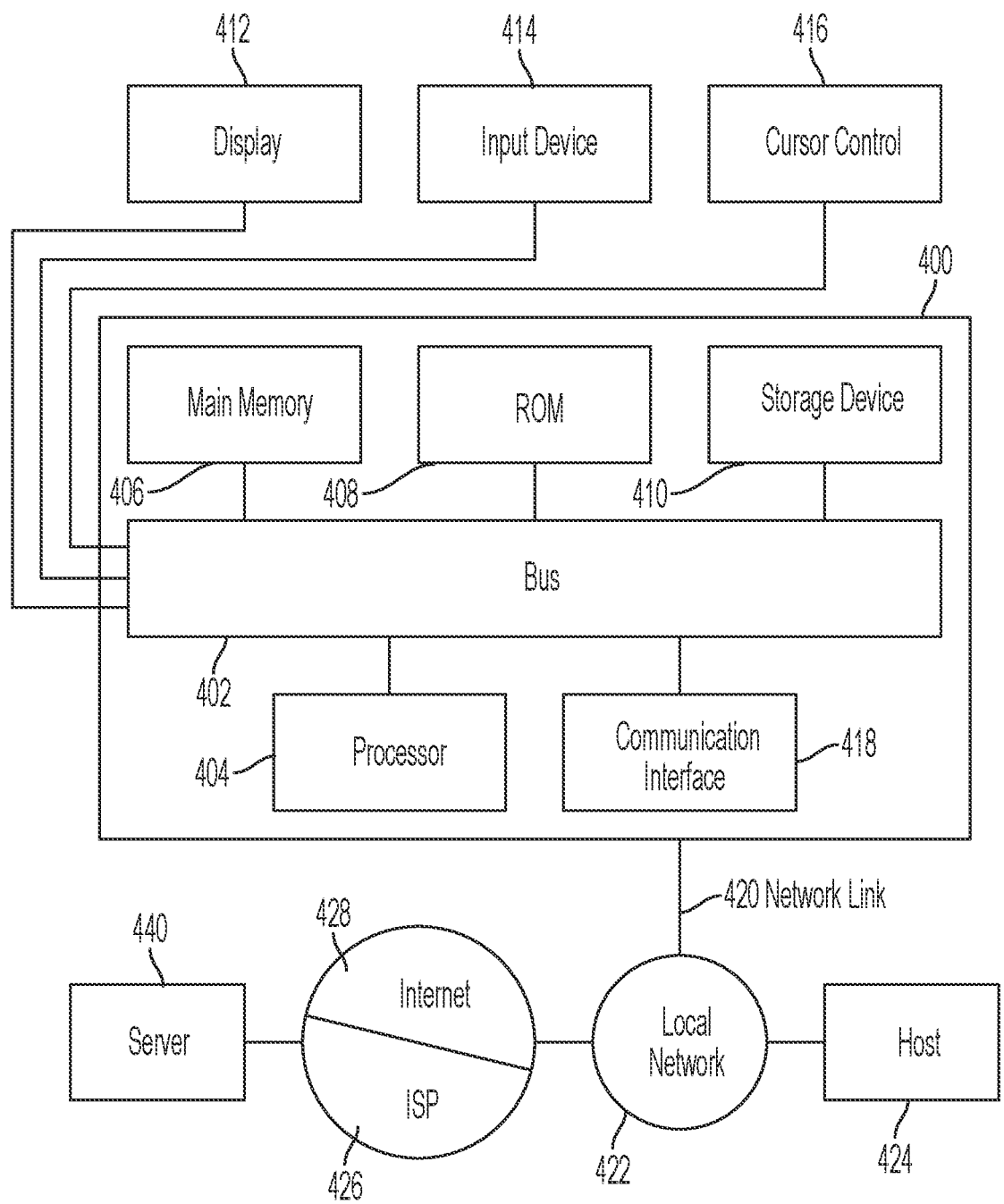
FIG. 4 is a block diagram of an example of a computer system according to an embodiment.

For example, FIG. 4 is a block diagram of an example of a computer system 400 according to an embodiment. Computer system 400 includes a bus 402 or other communication mechanism for communicating information, and a hardware processor 404 coupled with the bus 402 for processing information. Hardware processor 404 may be a general-purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in one or more non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a liquid crystal display (LCD), plasma display, electronic ink display, cathode ray tube (CRT) monitor, or any other kind of device for displaying information to a computer user. An input device 414, including alphanumeric and other keys, may be coupled to bus 402 for communicating information and command selections to processor 404. Alternatively or additionally, computer system 400 may receive user input via a cursor control 416, such as a mouse, a trackball, a trackpad, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane. Alternatively or additionally, computer system 4 may include a touchscreen. Display 412 may be configured to receive user input via one or more pressure-sensitive sensors, multi-touch sensors, and/or gesture sensors. Alternatively or additionally, computer system 400 may receive user input via a microphone, video camera, and/or some other kind of user input device (not shown).

Computer system 400 may implement the techniques described herein using customized hard-wired logic, one or more ASICs or FPGAs, firmware, and/or program logic which in combination with other components of computer system 400 causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. Alternatively or additionally, hard-wired circuitry may be used in place of or in combination with software instructions.

The term "storage media" as used herein refers to one or more non-transitory media storing data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape or other magnetic data storage medium, a CD-ROM or any other optical data storage medium, any physical medium with patterns of holes, a RAM, a programmable read-only memory (PROM), an erasable PROM (EPROM), a FLASH-EPROM, non-volatile random-access memory (NVRAM), any other memory chip or cartridge, content-addressable memory (CAM), and ternary content-addressable memory (TCAM).

A storage medium is distinct from but may be used in conjunction with a transmission medium. Transmission media participate in transferring information between storage media. Examples of transmission media include coaxial cables, copper wire, and fiber optics, including the wires that comprise bus 402. Transmission media may also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer may load the instructions into its dynamic memory and send the instructions over a network, via a network interface controller (NIC), such as an Ethernet controller or Wi-Fi controller. A NIC local to computer system 400 may receive the data from the network and place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP)

426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422, and communication interface 418.

The received code may be executed by processor 404 as it is received, and/or stored in storage device 410, or other non-volatile storage for later execution.

In an embodiment, a computer network provides connectivity among a set of nodes running software that utilizes techniques as described herein. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (for example, a request to execute a particular application and/or retrieve a particular set of data). A server process responds by executing the requested service and/or returning corresponding data.

A computer network may be a physical network, including physical nodes connected by physical links. A physical node is any digital device. A physical node may be a function-specific hardware device. Examples of function-specific hardware devices include a hardware switch, a hardware router, a hardware firewall, and a hardware NAT. Alternatively or additionally, a physical node may be any physical resource that provides compute power to perform a task, such as one that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (for example, a physical network). Each node in an overlay network corresponds to a respective node in the underlying network. Accordingly, each node in an overlay network is associated with both an overlay address (to address the overlay node) and an underlay address (to address the underlay node that implements the overlay node). An overlay node may be a digital device and/or a software process (for example, a virtual machine, an application instance, or a thread). A link that connects overlay nodes may be implemented as a tunnel through the underlying network. The overlay nodes at either end of the tunnel may treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources may be shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). In a hybrid cloud, a computer network includes a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, a system supports multiple tenants. A tenant is a corporation, organization, enterprise, business unit, employee, or other entity that accesses a shared computing resource (for example, a computing resource shared in a public cloud). One tenant (through operation, tenant-specific practices, employees, and/or identification to the external world) may be separate from another tenant. The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In an embodiment, in a multi-tenant computer network, tenant isolation is implemented to ensure that the applications and/or data of different tenants are not shared with each other. Various tenant isolation approaches may be used. In an embodiment, each tenant is associated with a tenant ID. Applications implemented by the computer network are tagged with tenant ID's. Additionally or alternatively, data structures and/or datasets, stored by the computer network, are tagged with tenant ID's. A tenant is permitted access to a particular application, data structure, and/or dataset only if the tenant and the particular application, data structure, and/or dataset are associated with a same tenant ID. As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants. A subscription list may indicate which tenants have authorization to access which applications. For each application, a list of tenant ID's of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels may be used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

What is claimed is:

1. A storage device comprising:
   one or more authentication components comprising one or more of a biometric reader, a positioning system, and a wireless receiver; and
   a security subsystem configured to secure data using a plurality of authentication factors obtained using the one or more authentication components, the plurality of authentication factors comprising a plurality of biometric credentials of at least one required user and at least one optional user from a plurality of optional users, the at least one required user and the at least one optional user required by the storage device to be present at the storage device to decrypt the data, identities of the at least one required user and the plurality of optional users being defined in an index of the security subsystem.

2. The storage device of claim 1, the security subsystem being configured to require the plurality of biometric credentials in a predetermined order of the at least one required user and the at least one optional user.

3. The storage device of claim 1, the security subsystem being configured to store a plurality of authorized biometric credentials in the index.

4. The storage device of claim 3, the index comprising dummy biometric credentials prepopulated at unused index locations.

5. The storage device of claim 1, the plurality of authentication factors comprising a position of the storage device determined using the positioning system, the position of the storage device comprising one or more of a geographical location, a logical location, and an altitude.

6. The storage device of claim 1, the plurality of authentication factors comprising proximity of at least one authentication device determined using the wireless receiver.

7. The storage device of claim 1, further comprising instructions for presenting a user interface for configuring the plurality of authentication factors.

8. The storage device of claim 7, configuring the plurality of authentication factors comprising obtaining user input defining one or more required factors in the plurality of authentication factors.

9. A method for securing data, comprising:
   obtaining a plurality of authentication factors using one or more authentication components of a secure storage device, the one or more authentication components comprising one or more of a biometric reader, a positioning system, and a wireless receiver; and
   securing, by a security subsystem of the storage device, data using the plurality of authentication factors obtained using the one or more authentication components, the plurality of authentication factors comprising a plurality of biometric credentials of at least one required user and at least one optional user from a plurality of optional users, the at least one required user and the at least one optional user required by the storage device to be present at the storage device to decrypt the data, identities of the at least one required user and the plurality of optional users being defined in an index of the security subsystem.

10. The method of claim 9, securing the data comprising requiring the plurality of biometric credentials in a predetermined order of the at least one required user and the at least one optional user.

11. The method of claim 9, further comprising storing a plurality of authorized biometric credentials in the index.

12. The method of claim 11, the index comprising dummy biometric credentials prepopulated at unused index locations.

13. The method of claim 9, the plurality of authentication factors comprising a position of the storage device determined using the positioning system, the position of the storage device comprising one or more of a geographical location, a logical location, and an altitude.

14. The method of claim 9, the plurality of authentication factors comprising proximity of at least one authentication device determined using the wireless receiver.

15. The method of claim 9, further comprising presenting a user interface for configuring the plurality of authentication factors.

16. The method of claim 15, configuring the plurality of authentication factors comprising obtaining user input defining one or more required factors in the plurality of authentication factors.

* * * * *